(12) United States Patent
Yoo et al.

(10) Patent No.: US 10,100,161 B2
(45) Date of Patent: Oct. 16, 2018

(54) POLYAMIDE BASED POLYMER COMPOSITIONS COMPRISING CYCLIC COMPOUND AND POLYMER BASED COMPOSITE MATERIAL USING THE SAME

(71) Applicant: Korea Research Institute of Chemical Technology, Daejeon (KR)

(72) Inventors: Youngjae Yoo, Daejeon (KR); Hwan Seok Choi, Daejeon (KR); Yong Seok Kim, Daejeon (KR); Byoung Gak Kim, Daejeon (KR); Dong-Gyun Kim, Gyeonggi-do (KR); Sung-Goo Lee, Daejeon (KR); Dohyun Im, Buson (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 15/658,528

(22) Filed: Jul. 25, 2017

(65) Prior Publication Data

US 2018/0030220 A1 Feb. 1, 2018

(30) Foreign Application Priority Data

Jul. 26, 2016 (KR) .......................... 10-2016-0094892

(51) Int. Cl.
| | |
|---|---|
| *C08K 5/20* | (2006.01) |
| *C08F 20/00* | (2006.01) |
| *C08G 63/00* | (2006.01) |
| *C08J 5/04* | (2006.01) |
| *B29B 7/00* | (2006.01) |
| *B29C 47/00* | (2006.01) |
| *B29C 45/00* | (2006.01) |
| *B29K 77/00* | (2006.01) |
| *B29K 105/12* | (2006.01) |
| *B29K 307/04* | (2006.01) |
| *B29K 309/08* | (2006.01) |

(52) U.S. Cl.
CPC ............... *C08J 5/043* (2013.01); *B29B 7/005* (2013.01); *B29C 45/0001* (2013.01); *B29C 45/0005* (2013.01); *B29C 47/0004* (2013.01); *C08K 5/20* (2013.01); *B29K 2077/00* (2013.01); *B29K 2105/12* (2013.01); *B29K 2307/04* (2013.01); *B29K 2309/08* (2013.01); *C08J 2377/06* (2013.01)

(58) Field of Classification Search
CPC ....... C08J 5/043; C08J 2377/06; B29B 7/005; B29C 47/0004; B29C 45/0001; B29C 45/0005; C08K 5/20; B29K 2077/00; B29K 2105/12; B29K 2307/04; B29K 2309/08
USPC .......................... 524/227; 526/306; 525/32.1
See application file for complete search history.

(56) References Cited

U.S. PATENT DOCUMENTS

| | | | |
|---|---|---|---|
| 6,407,157 B2 | 6/2002 | Oyamada et al. | |
| 2003/0194543 A1 | 10/2003 | Kawabata et al. | |
| 2005/0008855 A1* | 1/2005 | Figuly ................... | D01D 5/253 428/364 |

FOREIGN PATENT DOCUMENTS

| | | |
|---|---|---|
| EP | 2 940 190 A1 | 11/2015 |
| JP | 08 73626 A | 3/1996 |
| JP | 2014-129494 A | 7/2014 |
| KR | 100810996 B1 | 3/2008 |
| KR | 2009 0063382 A | 6/2009 |
| KR | 2016 0077273 A | 7/2016 |

* cited by examiner

*Primary Examiner* — William K Cheung
(74) *Attorney, Agent, or Firm* — Hahn Loeser & Parks LLP

(57) ABSTRACT

The present disclosure relates to a polyamide-based polymer composition with superior fluidity and a polyamide-based composite material with superior mechanical strength prepared therefrom. More specifically, it relates to a polyamide-based polymer composition containing 0.1-5 parts by weight of dicyclohexylmethane bisdecanoamide, which is a cyclic compound, as a fluidity control agent based on 100 parts by weight of a mixture consisting of 20-90 wt % of a polyamide-based resin and 10-80 wt % of a reinforcing fiber, a polyamide-based composite material prepared using the same, and a method for preparing the same. The polymer composition according to the present disclosure, wherein dicyclohexylmethane bisdecanoamide is used as a fluidity control agent, provides an effect of reducing friction between a molten resin and a processing machine and greatly reducing torque by effectively dispersing a reinforcing fiber in a polyamide-based resin. Also, the polymer composition according to the present disclosure may be usefully used in compounding, extrusion molding and injection molding of polyamide-based engineering plastics containing reinforcing fibers at high contents. In addition, according to the present disclosure, the addition of the fluidity control agent greatly improves flowability during processing. Therefore, a polyamide-based composite material with superior mechanical strength can be prepared under relatively mild conditions because uniform mixing of the reinforcing fiber and the polymer resin is induced.

10 Claims, No Drawings

POLYAMIDE BASED POLYMER COMPOSITIONS COMPRISING CYCLIC COMPOUND AND POLYMER BASED COMPOSITE MATERIAL USING THE SAME

The present application claims priority to Korean Patent Application No. 10-2016-0094892 filed on Jul. 26, 2016 in the Republic of Korea, the disclosures of which are incorporated herein by reference.

TECHNICAL FIELD

The present disclosure relates to a polyamide-based polymer composition to which a cyclic compound is added and a polyamide-based composite material using the same.

More specifically, it relates to a polyamide-based polymer composition containing 0.1-5 parts by weight of dicyclohexylmethane bisdecanoamide, which is a cyclic compound, as a fluidity control agent based on 100 parts by weight of a mixture consisting of 20-90 wt % of a polyamide-based resin and 10-80 wt % of a reinforcing fiber, a polyamide-based composite material prepared using the same, and a method for preparing the same.

BACKGROUND ART

Recently, as the governments of all the countries of the world tighten regulations on fuel efficiency and exhaust gas of vehicles, automakers are making consistent efforts to reduce vehicle weights. Methods for reducing the vehicle weights include reduction of automotive parts through optimized design and maximized performance, use of light alternative materials such as aluminum, magnesium, engineering plastics, fiber-reinforced plastics, fiber-reinforced composite materials, etc., or the like. The use of light alternative materials can maximize the effect of reducing weights not only by reducing the weights of the parts themselves but also by allowing optimized design and parts integration.

The fiber-reinforced plastic or fiber-reinforced composite material collectively a composite material made of a plastic matrix reinforced with a glass fiber, a carbon fiber, an aramid fiber, etc. Recently, it is widely used not only in automotive interior parts but also in parts requiring high strength and heat resistance such as engine parts, chassis, etc. In addition, with the recent trend of high performance and lightweightness of parts for automobiles and industrial products, more precise shapes as well as high heat resistance, rigidity, etc. are being required for the parts.

Polyamide-based composite materials having superior rigidity, toughness, chemical resistance, etc. can replace aluminum, steel, etc. due to superior lightweightness, impact resistance, thermal expansivity, economic efficiency, etc. Because they can reduce weight up to 30% or more when used for automotive parts, they can be used not only in automotive exterior parts but also in interior parts including housing, etc. in order to reduce the weight of automobiles and allow flexible designing and easy molding, etc.

As a prior art related to the polyamide-based composite material, Korean Patent Publication No. 10-2009-0063382 relates to a reinforced polyamide resin composition, more particularly to a reinforced polyamide resin composition which experiences 5% or less of weight reduction after TGA analysis at 300° C. (after 10 minutes), has 20 g/10 min or more of fluidity measured according to ASTM D1238, has 3 or higher grade of gray scale after irradiation with xenon arc of 65 W/m2 and 126 MJ/m2 and 1,300-3,000 kg/m2 of flexural strength measured according to ASTM D790.

In order to improve the performance of the polyamide-based composite material, a compounding process of adding various reinforcing materials is necessary. But, when a large amount of glass fiber is added, the fluidity becomes unsatisfactory. And, when satisfactory physical properties are achieved, molding through existing extrusion or injection processes is difficult because of poor processability. There are limitations in improving the processability of a polymer by changing monomers or their molecular weight and molecular structure. Therefore, in order to improve the processability, an appropriate processing machine has to be selected and a fluidity control agent affecting the viscosity behavior of a molten material, such as a lubricant, has to be used.

In particular, a glass fiber-reinforced composite material with a glass fiber content of 50% or higher has limitations in productivity and physical properties due to the fracture of the glass fiber and has a flexural modulus of only 15 GPa, which falls short of 25% of that of aluminum (64 GPa). Therefore, research and development are necessary to overcome these problems.

The inventors of the present disclosure have studied on polymer compositions with superior fluidity. In doing so, they have developed a polymer composition containing 20-90 wt % of a polyamide-based resin and 10-80 wt % of a glass fiber, wherein dicyclohexylmethane bisdecanoamide is added to the polymer composition as a fluidity control agent, and have found out that the polymer composition has superior fluidity and mechanical strength.

REFERENCES OF THE RELATED ART

Patent Document (Patent document 1) Korean Patent Publication No. 10-2009-0063382.

DISCLOSURE

Technical Problem

The present disclosure is directed to providing a polyamide-based polymer composition having superior fluidity and superior mechanical strength and a polyamide-based composite material containing the same.

The present disclosure is also directed to allowing reduced friction between a molten resin and a processing machine and effective dispersion of a reinforcing fiber in a polyamide-based resin by improving the fluidity of a composition when processing and molding a polymer resin mixed with a reinforcing fiber during the preparation of a thermoplastic polymer composite material containing the reinforcing fiber.

The present disclosure is also directed to providing a polyamide-based composite material having superior mechanical strength by inducing uniform mixing of a reinforcing fiber and a polymer resin, and a method for preparing the same.

Technical Solution

The present disclosure provides a polyamide-based polymer composition containing a mixture of a polyamide-based resin and a reinforcing fiber and dicyclohexylmethane bisdecanoamide as a fluidity control agent.

The mixture may consist of 20-90 wt % of a polyamide-based resin and 10-80 wt % of a reinforcing fiber.

The polyamide-based resin may be one or more polyamide selected from a group consisting of a polyamide derived from a lactam, a polyamide obtained from a reaction of a dicarboxylic acid and a diamine and a copolymer polyamide.

The reinforcing fiber may be one of a glass fiber and a carbon fiber. For effective mixing, the reinforcing fiber may be specifically a short fiber rather than a long fiber. Also, it may be specifically a glass fiber when considering economic efficiency, etc.

The fluidity control agent dicyclohexylmethane bisdecanoamide may be contained in an amount of 0.1-5 parts by weight based on 100 parts by weight of the mixture.

The present disclosure also provides a method for preparing a polyamide-based composite material, which includes: a melt-mixing step of preparing a molten mixture by adding dicyclohexylmethane bisdecanoamide as a fluidity control agent to a mixture of a polyamide-based resin and a reinforcing fiber and then mixing the same while heating; and a molding step of molding the molten mixture.

The mixture may consist of 20-90 wt % of a polyamide-based resin and 10-80 wt % of a reinforcing fiber. The melt-mixing step may be performed at 200-500° C. The molding step may be performed by extrusion-molding or injection-molding the molten mixture.

The present disclosure also provides a polyamide-based composite material prepared by the method for preparing a polyamide-based composite material, which contains a polyamide-based resin, a reinforcing fiber and dicyclohexylmethane bisdecanoamide as a fluidity control agent.

Advantageous Effects

A polymer composition according to the present disclosure, wherein dicyclohexylmethane bisdecanoamide is used as a fluidity control agent, provides an effect of reducing friction between a molten resin and a processing machine and greatly reducing torque by effectively dispersing a reinforcing fiber in a polyamide-based resin.

Also, the polymer composition according to the present disclosure may be usefully used in compounding, extrusion molding and injection molding of polyamide-based engineering plastics containing reinforcing fibers at high contents.

In addition, according to the present disclosure, the addition of the fluidity control agent greatly improves flowability during processing. Therefore, a polyamide-based composite material with superior mechanical strength can be prepared under relatively mild conditions because uniform mixing of the reinforcing fiber and the polymer resin is induced.

BEST MODE

It will be understood that the terms or words used in the detailed description and claims of the present disclosure should be interpreted as having a meaning that is consistent with their meaning in the context of the technical idea of the invention, based on the principle that an inventor may properly define the meaning of the terms or words to best explain the invention. It should also be understood that the exemplary embodiments described in the present disclosure do not represent all the technical idea of the present disclosure. Accordingly, there may exist various equivalents and modifications that can replace them within the purpose of the present disclosure at the time of the filing of this application.

The term "polyamide-based resin" used in the present disclosure may refer to a homopolymer or a copolymer. In the present disclosure, one or more linear or branched polyamide may be used as the polyamide. The linear polyamide may be prepared from a dicarboxylic acid and a diamine. The branched polyamide may be prepared from monomers having more than two acid or amine groups. Accordingly, it may be prepared from an amine and a carboxylic acid where a branching point may occur.

For example, the polyamide may be 7- to 13-membered cyclic polycaprolactam, polycaprylolactam or polylaurolactam derived from lactam or a polyamide obtained from a reaction of a dicarboxylic acid and a diamine.

Specifically, the dicarboxylic acid may be an alkanedicarboxylic acid or an aromatic dicarboxylic acid having 6 to 12, particularly 6 to 10, carbon atoms, specifically, adipic acid, azelaic acid, sebacic acid, dodecanedioic acid, terephthalic acid, isophthalic acid, etc. And, the diamine may be specifically an alkanediamine having 6 to 12, particularly 6 to 8, carbon atoms, m-xylylenediamine, di(4-aminophenyl)methane, di(4-aminocyclohexyl)methane, 2,2-di(4-aminophenyl)propane, 2,2-di(4-aminocyclohexyl)propane, 1,5-diamino-2-methylpentane, etc.

Accordingly, the polyamide may be specifically polyhexamethylene adipamide, polyhexamethylene sebacamide, polycaprolactam or, in particular, nylon 6/6, 6 copolymer having a caprolactam unit content of 5-95 wt %. In addition, a mixture of a plurality of polyamides with any desired mixing ratio or a polyamide that can be obtained from copolymerization of the two or more monomers described above may be used.

Hereinafter, the polyamide-based polymer composition according to the present disclosure is described in detail.

The polymer composition according to the present disclosure, which contains 0.1-5 parts by weight of dicyclohexylmethane bisdecanoamide, which is a cyclic compound, as a fluidity control agent based on 100 parts by weight of a mixture consisting of 20-90 wt % of a polyamide-based resin and 10-80 wt % of a reinforcing fiber, may exhibit superior fluidity and superior mechanical strength.

A composite material prepared from the polymer composition exhibiting superior fluidity and superior mechanical strength may be usefully used in compounding, extrusion molding and injection molding of polyamide-based engineering plastics containing reinforcing fibers at high contents.

The reinforcing fiber may be one of a glass fiber and a carbon fiber. For effective mixing, the reinforcing fiber may be specifically a short fiber rather than a long fiber. Also, it may be specifically a glass fiber when considering economic efficiency, etc.

Specifically, the polymer composition according to the present disclosure provides an effect of decreasing viscosity toward a high-shear-rate range. This is significantly effective in reducing overall production cost by reducing load applied to a machine by improving fluidity in actual extrusion and injection conditions, thereby prolonging the service life of the machine, and by reducing power consumption, output energy, etc. In addition, the polymer composition according to the present disclosure can be used in various applications because it has superior mechanical strength.

In the polymer composition according to the present disclosure, the fluidity control agent dicyclohexylmethane bisdecanoamide is a compound represented by Chemical Formula 1.

<Chemical Formula 1>

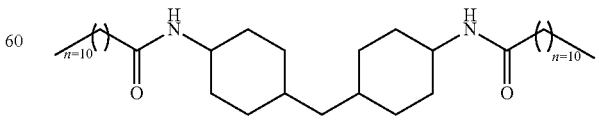

The dicyclohexylmethane bisdecanoamide used in the present disclosure as a fluidity control agent may exhibit very superior fluidity as compared to the existing fluidity control agent.

Specifically, the fluidity control agent may be used in an amount of 0.1-5.0 parts by weight based on the mixture of the polyamide-based resin and the reinforcing fiber. When the amount of the fluidity control agent based on the mixture of the polyamide-based resin and the reinforcing fiber is less than 0.1 part by weight, superior fluidity cannot be achieved by adding the fluidity control agent. And, when the amount exceeds 5.0 parts by weight, a composite material prepared from the mixture of the polyamide-based resin and the reinforcing fiber has unsatisfactory mechanical strength.

The mixture of the polyamide-based resin and the reinforcing fiber according to the present disclosure may contain specifically 20-90 wt % of the polyamide-based resin and 10-80 wt % of the glass fiber, more specifically 20-50 wt % of the polyamide-based resin and 50-80 wt % of the glass fiber. The mixture of the polyamide-based resin and the reinforcing fiber according to the present disclosure may be used as a composition for preparing a glass fiber-reinforced composite material with a glass fiber content of 50 wt % or higher.

Hitherto, there have been limitations in improving productivity and physical properties when the glass fiber content is so high, due to the fracture of the glass fiber. However, the polymer composition according to the present disclosure can exhibit not only superior fluidity but also superior mechanical strength because of the use of the dicyclohexylmethane bisdecanoamide as the fluidity control agent.

The present disclosure also provides a method for preparing a polyamide-based composite material, which includes: a melt-mixing step of preparing a molten mixture by adding dicyclohexylmethane bisdecanoamide as a fluidity control agent to a mixture of a polyamide-based resin and a reinforcing fiber and then mixing the same while heating; and a molding step of molding the molten mixture.

Specifically, the mixture may be a mixture of 20-90 wt % of the polyamide-based resin and 10-80 wt % of the reinforcing fiber. More specifically, it may contain 20-50 wt % of the polyamide-based resin and 50-80 wt % of the glass fiber.

The method for preparing a polyamide-based composite material according to the present disclosure is for preparing a glass fiber-reinforced composite material with a glass fiber content of 50 wt % or higher. Hitherto, there have been limitations in improving productivity and physical properties when the glass fiber content is so high, due to the fracture of the glass fiber. However, superior fluidity as well as superior mechanical strength can be achieved by using the dicyclohexylmethane bisdecanoamide as the fluidity control agent.

A composite material prepared from the polymer composition exhibiting superior fluidity and superior mechanical strength may be usefully used in compounding, extrusion molding and injection molding of polyamide-based engineering plastics containing glass fibers at high contents.

Specifically, the dicyclohexylmethane bisdecanoamide as a fluidity control agent may be used in an amount of 0.1-5.0 parts by weight based on the mixture of the polyamide-based resin and the reinforcing fiber. When the fluidity control agent is used in an amount less than 0.1 part by weight based on the mixture of the polyamide-based resin and the reinforcing fiber, superior fluidity cannot be achieved by adding the fluidity control agent. And, when the amount exceeds 5.0 parts by weight, the prepared composite may have unsatisfactory mechanical strength.

The melt-mixing step may be performed at any temperature where the polyamide-based resin can be melted. For example, it may be performed at 200-500° C.

The molding step may be performed by extrusion-molding or injection-molding the molten mixture. Specifically, the extrusion molding may be performed at 200-350° C. When the extrusion molding is performed at a temperature below 200° C., it is difficult to uniformly mix the polyamide-based resin and the glass fiber. And, when it is performed at a temperature above 350° C., the prepared polyamide-based composite material may have unsatisfactory mechanical properties or economic efficiency may decrease due to the processing at high temperature. And, the injection molding in the method for preparing a polyamide-based composite material according to the present disclosure may be performed by a known method using an apparatus such as an injection molding machine.

Hereinafter, the present disclosure will be described in detail through examples and test examples. However, the following examples and test examples are for illustrative purposes only and the scope of the present disclosure is not limited by the examples and test examples.

<Example 1> Preparation of Polyamide-Based Polymer Composition 50 wt % of a polyamide-based resin (21ZLV, Ascend), 50 wt % of a glass fiber (123D, Owens Corning, length: 3 mm, diameter: 10 μm, chopped) and 1 phr (parts by weight based on 100 parts by weight of the total polymer composition) of dicyclohexylmethane bisdecanoamide (MCHA_DA) as a fluidity control agent were mixed uniformly.

Then, a polyamide-based polymer composition was prepared by melting and mixing the mixture using a twin screw-type 15 cc microcompounder (DSM Xplore) under the condition of a temperature of 280° C. and a screw rotation speed of 80 rpm for 4 minutes.

Comparative Example 1

A polymer composition was prepared by melting and mixing 50 wt % of a polyamide-based resin (21ZLV, Ascend) and 50 wt % of a glass fiber (123D, Owens Corning, length: 3 mm, diameter: 10 μm, chopped) using a twin screw-type 15 cc microcompounder (DSM Xplore) under the condition of a temperature of 280° C. and a screw rotation speed of 80 rpm for 4 minutes.

Comparative Example 2

50 wt % of a polyamide-based resin (21ZLV, Ascend), 50 wt % of a glass fiber (123D, Owens Corning, length: 3 mm, diameter: 10 μm, chopped) and 1 phr (parts by weight based on 100 parts by weight of the total polymer composition) of diphenylmethane bisdecanoamide (MDA_DA) as a fluidity control agent were mixed uniformly.

Then, a polymer composition was prepared by melting and mixing the mixture using a twin screw-type 15 cc microcompounder (DSM Xplore) under the condition of a temperature of 280° C. and a screw rotation speed of 80 rpm for 4 minutes.

<Test Example 1> Analysis of Average Torque

The following experiment was carried out in order to measure the average torque of the polymer composition according to the present disclosure.

Average torque was measured after melting and mixing the polymer compositions prepared in Example 1 and Comparative Examples 1-2 using a twin screw-type 15 cc microcompounder (DSM Xplore) under the condition of a temperature of 280° C. and a screw rotation speed of 80 rpm for 4 minutes. The result is shown in Table 1.

TABLE 1

| | Polyamide-based resin (wt %) | Glass fiber (wt %) | Fluidity control agent | Content (phr) | Average torque (N) |
|---|---|---|---|---|---|
| Example 1 | 50 | 50 | MCHA_DA | 1 | 1313 |
| Comparative Example 1 | 50 | 50 | — | 0 | 1715 |
| Comparative Example 2 | 50 | 50 | MDA_DA | 1 | 1297 |

As seen from Table 1, the polymer composition containing dicyclohexylmethane bisdecanoamide as a fluidity control agent according to the present disclosure shows a very superior effect of reducing average torque. To compare Example 1 with Comparative Example 1, it can be seen that the average torque of the polymer composition containing dicyclohexylmethane bisdecanoamide (MCHA_DA) of Example 1 is decreased by about 23% as compared to the polymer composition not containing dicyclohexylmethane bisdecanoamide (MCHA_DA) of Comparative Example 1. To compare Example 1 with Comparative Example 2, it can be seen that the polymer composition containing dicyclohexylmethane bisdecanoamide (MCHA_DA) of Example 1 shows a comparable effect of decreasing average torque as compared to the polymer composition containing diphenylmethane bisdecanoamide (MDA_DA) of Comparative Example 2.

<Test Example 2> Analysis of Viscosity

The following experiment was carried out in order to measure the viscosity of the polymer composition according to the present disclosure.

The viscosity of the polymer compositions prepared in Example 1 and Comparative Examples 1-2 was measured using a capillary viscometer (Rheograph 25, Göttfert). The result is shown in Table 2.

TABLE 2

| | Fluidity control agent | Content (phr) | Shear rate (1/s) | Shear stress (Pa) | Viscosity (Pa · s) |
|---|---|---|---|---|---|
| Example 1 | MCHA_DA | 1 | 100.0001 | 12818.3330 | 128.1832 |
| | | | 500.0004 | 37509.0820 | 75.0181 |
| | | | 1000.0008 | 62490.7500 | 62.4907 |
| | | | 5000.0039 | 176480.0000 | 35.2960 |
| | | | 9999.9902 | 260166.8675 | 26.0167 |
| Comparative Example 1 | — | 0 | 100.0001 | 332330.0000 | 168.9915 |
| | | | 500.0004 | 53085.8320 | 106.1716 |
| | | | 1000.0008 | 88700.0000 | 88.6999 |
| | | | 5000.0039 | 238105.0156 | 47.6210 |
| | | | 9999.9902 | 332330.0000 | 33.2330 |
| Comparative Example 2 | MDA_DA | 1 | 100.0001 | 15107.5000 | 151.0749 |
| | | | 500.0004 | 45535.8320 | 91.0716 |
| | | | 1000.0008 | 73505.0000 | 73.5049 |

TABLE 2-continued

| Fluidity control agent | Content (phr) | Shear rate (1/s) | Shear stress (Pa) | Viscosity (Pa · s) |
|---|---|---|---|---|
| | | 5000.0039 | 206219.1719 | 41.2438 |
| | | 9999.9902 | 296412.5000 | 29.6413 |

As seen from Table 2, the polymer composition containing dicyclohexylmethane bisdecanoamide (MCHA_DA) as a fluidity control agent according to the present disclosure shows an effect of decreasing viscosity toward a high-shear-rate range.

This is significantly effective in reducing overall production cost by reducing load applied to a machine by improving fluidity in actual extrusion and injection conditions, thereby prolonging the service life of the machine, and by reducing power consumption, output energy, etc.

<Test Example 3> Analysis of Flowability

The following experiment was carried out in order to measure the flowability of the polymer composition according to the present disclosure.

The flowability of the polymer compositions prepared in Example 1 and Comparative Examples 1-2 was measured using a spiral mold under the condition of a mold temperature of 80° C. and an injection pressure of 6 bar. The result is shown in Table 3.

TABLE 3

| | Polyamide-based resin (wt %) | Glass fiber (wt %) | Fluidity control agent | Content (phr) | Flowability (cm) |
|---|---|---|---|---|---|
| Example 1 | 50 | 50 | MCHA_DA | 1 | 44 |
| Comparative Example 1 | 50 | 50 | — | 0 | 35.6 |
| Comparative Example 2 | 50 | 50 | MDA_DA | 1 | 40.7 |

As seen from Table 3, the polymer composition containing dicyclohexylmethane bisdecanoamide (MCHA_DA) as a fluidity control agent according to the present disclosure shows a significantly improved flowability. To compare Example 1 with Comparative Example 1, it can be seen that the flowability of the polymer composition containing dicyclohexylmethane bisdecanoamide of Example 1 is increased by about 23% as compared to the polymer composition not containing dicyclohexylmethane bisdecanoamide of Comparative Example 1. To compare Example 1 with Comparative Example 2, it can be seen that the flowability of the polymer composition containing dicyclohexylmethane bisdecanoamide (MCHA_DA) of Example 1 is increased by about 14% as compared to the polymer composition containing diphenylmethane bisdecanoamide (MDA_DA) of Comparative Example 2.

<Test Example 4> Measurement of Physical Properties

The following experiment was carried out in order to measure the physical properties of the polymer composition according to the present disclosure.

The physical properties of the polymer compositions prepared in Example 1 and Comparative Examples 1-2 were measured using a universal testing machine (Instron) and an Izod impact tester (Instron). The result is shown in Table 4.

TABLE 4

| | Polyamide-based resin (wt %) | Glass fiber (wt %) | Fluidity control agent | Content (phr) | Flexural modulus (MPa) | Tensile strength (MPa) | Impact strength (kJ/m$^2$) |
|---|---|---|---|---|---|---|---|
| Ex. 1 | 50 | 50 | MCHA_DA | 1 | 14830 | 244 | 20 |
| Comp. Ex. 1 | 50 | 50 | — | 0 | 14155 | 236 | 19 |
| Comp. Ex. 2 | 50 | 50 | MDA_DA | 1 | 15025 | 242 | 20 |

As seen from Table 4, the polymer composition containing dicyclohexylmethane bisdecanoamide as a fluidity control agent according to the present disclosure has excellent fluidity for molding and improved mechanical properties as compared to the compositions not containing dicyclohexylmethane bisdecanoamide.

As described above, it can be seen that the polymer composition according to the present disclosure, wherein dicyclohexylmethane bisdecanoamide is used as a fluidity control agent, provides an effect of reducing friction between a molten resin and a processing machine and greatly reducing torque by effectively dispersing a reinforcing fiber in a polyamide-based resin.

Also, the polymer composition according to the present disclosure may be usefully used in compounding, extrusion molding and injection molding of polyamide-based engineering plastics containing reinforcing fibers at high contents. In addition, according to the present disclosure, the addition of the fluidity control agent greatly improves flowability during processing. Therefore, a polyamide-based composite material with superior mechanical strength can be prepared under relatively mild conditions because uniform mixing of the reinforcing fiber and the polymer resin is induced.

What is claimed is:

1. A polyamide-based polymer composition comprising a mixture of a polyamide-based resin and a reinforcing fiber and dicyclohexylmethane bisdecanoamide as a fluidity control agent.

2. The polyamide-based polymer composition according to claim 1, wherein the mixture consists of 20-90 wt % of a polyamide-based resin and 10-80 wt % of a reinforcing fiber.

3. The polyamide-based polymer composition according to claim 1, wherein the polyamide-based resin is one or more polyamide selected from a group consisting of a polyamide derived from a lactam, a polyamide obtained from a reaction of a dicarboxylic acid and a diamine and a copolymer polyamide.

4. The polyamide-based polymer composition according to claim 1, wherein the reinforcing fiber is one of a glass fiber and a carbon fiber.

5. The polyamide-based polymer composition according to claim 1, wherein the dicyclohexylmethane bisdecanoamide as a fluidity control agent is comprised in an amount of 0.1-5 parts by weight based on 100 parts by weight of the mixture.

6. A method for preparing a polyamide-based composite material, which comprises:
   a melt-mixing step of preparing a molten mixture by adding dicyclohexylmethane bisdecanoamide as a fluidity control agent to a mixture of a polyamide-based resin and a reinforcing fiber and then mixing the same while heating; and
   a molding step of molding the molten mixture.

7. The method for preparing a polyamide-based composite material according to claim 6, wherein the mixture consists of 20-90 wt % of a polyamide-based resin and 10-80 wt % of a reinforcing fiber.

8. The method for preparing a polyamide-based composite material according to claim 6, wherein the melt-mixing step is performed at 200-500° C.

9. The method for preparing a polyamide-based composite material according to claim 6, wherein the molding step is performed by extrusion-molding or injection-molding the molten mixture.

10. A polyamide-based composite material prepared by the method according to claim 6, which comprises a polyamide-based resin, a reinforcing fiber and dicyclohexylmethane bisdecanoamide as a fluidity control agent.

* * * * *